US012632604B2

(12) United States Patent
Loubet Moundi et al.

(10) Patent No.: US 12,632,604 B2
(45) Date of Patent: May 19, 2026

(54) NEURAL NETWORK INTEGRITY VALIDATION

(71) Applicant: THALES DIS FRANCE SAS, Meudon (FR)

(72) Inventors: Philippe Loubet Moundi, La Ciotat (FR); Eric Claise, Le Castellet (FR); Eric Bourbao, Le Beausset (FR)

(73) Assignee: THALES DIS FRANCE SAS, Meudon (FR)

( * ) Notice: Subject to any disclaimer, the term of this patent is extended or adjusted under 35 U.S.C. 154(b) by 205 days.

(21) Appl. No.: 18/267,537

(22) PCT Filed: Dec. 15, 2021

(86) PCT No.: PCT/EP2021/086023

§ 371 (c)(1),
(2) Date: Jun. 15, 2023

(87) PCT Pub. No.: WO2022/129245

PCT Pub. Date: Jun. 23, 2022

(65) Prior Publication Data

US 2024/0054249 A1      Feb. 15, 2024

(30) Foreign Application Priority Data

Dec. 18, 2020      (EP) .................................... 20306602

(51) Int. Cl.
*G06F 21/64* (2013.01)
*G06V 40/10* (2022.01)
(52) U.S. Cl.
CPC .............. *G06F 21/64* (2013.01); *G06V 40/10* (2022.01)

(58) Field of Classification Search
CPC ............ G06F 21/64; G06F 2221/2123; G06F 21/554; G06V 40/10; G06N 3/048; G06N 3/04; G06N 3/08
See application file for complete search history.

(56) References Cited

U.S. PATENT DOCUMENTS 10,733,292 B2 *   8/2020   Araujo ................... G06N 3/045
10,810,725 B1 *  10/2020   Dolhansky ......... G06V 10/7747
(Continued)

OTHER PUBLICATIONS

International Search Report (PCT/ISA/210) and Written Opinion (PCT/ISA/237) mailed on Apr. 8, 2022, by the European Patent Office as the International Searching Authority for current International Application No. PCT/EP2021/086023—[12 pages].

*Primary Examiner* — Khalid M Almaghayreh

(57) ABSTRACT

A neural network is trained to match digital samples to categories in a set of categories and when presented with at least one golden sample, which is a sample outside the set of categories, to output a probability vector indicative of a preposterous result that the golden sample is matched to a predefined category in the set of categories. The secure computer system is programmed with the trained neural network, adapted to receive digital samples and to present the digital samples to the trained neural network. As an integrity check, the computer system, is caused to present the golden sample to the trained neural network and if the neural network outputs a probability vector classifying the golden sample into a predefined category in a way that is a preposterous result, declaring the neural network as uncompromised and, otherwise, declaring the neural network as compromised.

12 Claims, 9 Drawing Sheets

(56) References Cited

U.S. PATENT DOCUMENTS

| | | | | | |
|---|---|---|---|---|---|
| 10,970,331 | B2 * | 4/2021 | Whitman | ............ | G06V 10/764 |
| 11,501,156 | B2 * | 11/2022 | Zhang | ..................... | G06N 3/09 |
| 11,610,098 | B2 * | 3/2023 | Dong | ................... | G06F 18/241 |
| 2020/0005133 | A1 * | 1/2020 | Zhang | .................. | G06N 3/045 |
| 2020/0019699 | A1 * | 1/2020 | Araujo | ............... | H04L 63/1491 |
| 2020/0082002 | A1 * | 3/2020 | Whitman | ............... | G06F 17/18 |
| 2020/0210808 | A1 * | 7/2020 | Dong | ................. | G06N 3/0895 |
| 2020/0234121 | A1 * | 7/2020 | Stapleton | ............... | G06F 21/31 |
| 2021/0157911 | A1 * | 5/2021 | Yu | ....................... | G06N 3/0455 |
| 2022/0114345 | A1 * | 4/2022 | Belém | .................... | G06N 3/04 |
| 2022/0114595 | A1 * | 4/2022 | Balayan | ................... | G06N 3/08 |
| 2023/0094415 | A1 * | 3/2023 | Zhao | .................. | G06N 3/0442 |
| | | | | | 706/20 |

* cited by examiner

705

| Category | Probability |
|----------|-------------|
| Car | High |
| Train | Low |
| Truck | Low |
| Tractor | Low |
| Plane | Low |
| Bus | Low |
| Helicopter | Low |

703

Trained Neural Network

701

521

707

| Category | Probability |
|----------|-------------|
| Car | Low |
| Train | Low |
| Truck | Low |
| Tractor | Low |
| Plane | High |
| Bus | Low |
| Helicopter | Low |

NEURAL NETWORK INTEGRITY VALIDATION

BACKGROUND

The present invention relates, generally, to neural networks, and, more particularly, to integrity checking of neural networks.

Neural networks have become an increasingly valuable tool for image recognition, pattern recognition, and voice recognition. Such neural networks may be used for biometric verification. Accurate verification can authenticate persons correctly; inaccurate verification can cause both false positives, i.e., interpreting an imposter as being the person being authenticated, and false negatives, i.e., falsely interpreting a person as being an imposter.

Furthermore, with increased use of automation, e.g., self-driving vehicles and factory automation, it is necessary to interpret the operating environment such as traffic events, road conditions, and factory floor situation. Neural networks have become a central tool used in these applications of image processing.

Security of such neural networks is of utmost importance to the security of systems that rely on neural networks for mission-critical purposes. Consider as an example, a neural network used to verify whether a given person should be admitted through some kind of filter, e.g., a gate, a secure door, or a border control, may be based on facial recognition, i.e., does the person match a specific person in a database or an image digitally recorded on an identification object. Manipulation of that neural network is one mechanism by which that security system may be attacked. For example, the neural network could be manipulated to recognize an imposter as an authorized person.

Similarly, neural networks used in automation must also be secure. One could, for example, envision terrorism or blackmail attacks based on the infiltration of neural networks used in self-driving cars. Imagine, for example, the ramifications of self-driving cars, after an attack against an image-processing neural network that causes it to fail to recognize pedestrians in crosswalks. Similar threats can occur on automated factory floors, delivery systems, aviation, etc.

There are numerous algorithms used to verify that a data structure has not been compromised. These techniques include integrity check using hashing algorithms, such as HMAC, checksum calculations, and code integrity with a digital signature. Common to these techniques is that the data structure is used as an input to a mathematical algorithm that produces an expected number. If that expected number, e.g., the hash value, matches an expected value that may have been saved in a secure form, the integrity of the data structure is assumed.

Unfortunately, the aforementioned integrity check mechanisms are not ideally applied to neural networks. Often, in the case of neural networks, running a conventional integrity check, such as a hash operation or a checksum, would require a reboot of the system running the neural network to perform the integrity check at an initial state of the neural network. That may not be practical. Neural networks are complex structures of many layers of interconnected nodes. These nodes have parameters, referred to as weights, that cause different behaviors depending on the input to the nodes, respectively. During the use of a neural network these weights may undergo adjustments. Such adjustments, even if very minor, could cause large changes in a hash or checksum value.

Furthermore, traditional integrity check procedures require operations that are not normally performed by the neural network. It would be desirable to perform an integrity check on the neural network while executing procedures for which the neural network is designed.

From the foregoing it is apparent that there is a need for an improved method to verify the integrity of neural networks that act as core components in critical systems such security and automation applications.

SUMMARY

A preferred embodiment of the invention provides for securing the integrity of a neural network used in a secure computer system.

The neural-network integrity checking technology of the invention is readily deployed into a security system that uses neural networks using operations that are analogous to those performed by the neural network.

In an embodiment, the neural network is trained to match digital samples to categories in a set of categories and when presented with at least one golden sample, which is a sample outside the set of categories, to output a probability vector indicative of a preposterous result that the golden sample is matched to a predefined category in the set of categories. The secure computer system is programmed with the trained neural network, adapted to receive digital samples and to present the digital samples to the trained neural network. As an integrity check, the computer system, is caused to present the golden sample to the trained neural network and if the neural network outputs a probability vector classifying the golden sample into a predefined category in a way that is a preposterous result, declaring the neural network as uncompromised and, otherwise, declaring the neural network as compromised.

In an embodiment the preposterous result is indicated by a probability vector comprising a probability value for the specific category being mathematically significantly higher than for other categories.

In an embodiment, the digital sample is a digital image.

In further embodiments, the digital sample is digital biometric sample selected from the set including voice recording, fingerprint, handprint, footprint, iris scan, tattoo pattern, facial image.

In an aspect, the secure computer system provides a gate function and the digital sample is a sample purporting to allow for admission through the gate, which may be selected from the set including admission through a border, physical access to a facility, admission onto a network, log in on a computer system, authorization to use a device, access to an account.

According to a first aspect, this invention therefore relates to a method for securing the integrity of a neural network in a secure computer system, the method comprising:

training the neural network to match digital samples to categories in a set of categories;

training the neural network, when presented with at least one golden sample, which is a sample outside the set of categories, to output a probability vector indicative of a preposterous result that the golden sample is matched to a predefined category in the set of categories;

programing the secure computer system with the trained neural network;

adapting the computer system to receive digital samples and to present the digital samples to the trained neural network;

presenting, by the computer system, the golden sample to the trained neural network; and if the neural network outputs a probability vector classifying the golden sample into a predefined category in a way that is a preposterous result, declaring the neural network as uncompromised and, otherwise, declaring the neural network as compromised.

According to a second aspect, this invention therefore relates to an artificial intelligence security device comprising:

a processor;

an input device connected to the processor to acquire digital samples and to provide the digital samples to the processor;

a memory connected to the processor and including instructions executable by the processor, the instructions comprising:

a neural network trained, when presented with at least one golden sample, which is a sample outside the set of categories, to output a probability vector indicative of a preposterous result that the golden sample is matched to a predefined category in the set of categories;

presenting the golden sample to the trained neural network and receiving a probability vector of the golden sample from the neural network; and if the neural network outputs a probability vector classifying the golden sample into a predefined category in a way that is a preposterous result, declaring the neural network as uncompromised and, otherwise, declaring the neural network as compromised.

DETAILED DESCRIPTION

Figure 1:
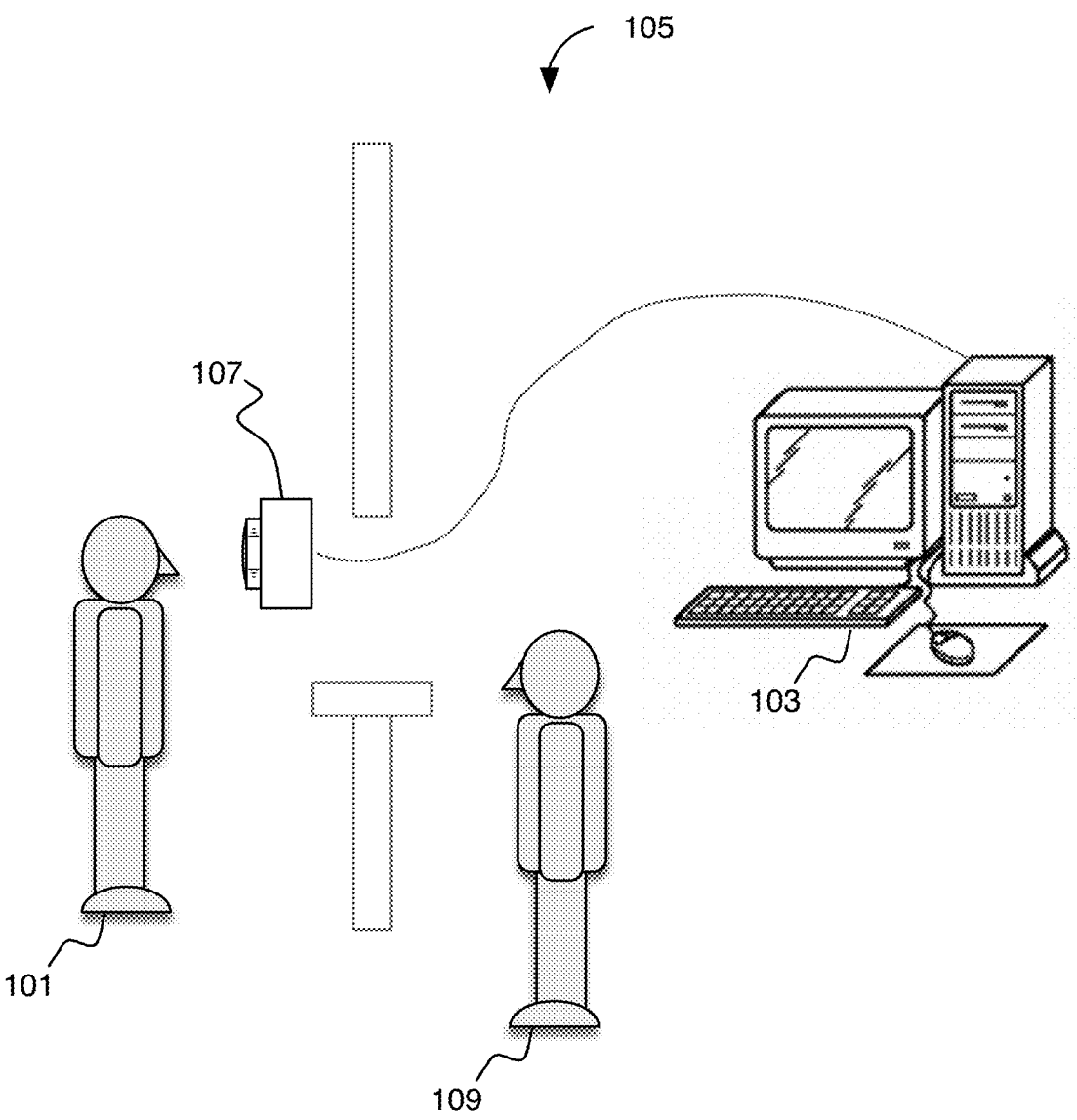
FIG. 1 is an illustration of an artificial intelligence system may be performing a security task.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The following description includes references to various methods executed by a processor of an integrated circuit chip. As is common in the field, there may be phrases herein that indicate these methods or method steps are performed by software instructions or software modules. As a person skilled in the art knows, such descriptions should be taken to mean that a processor, in fact, executes the methods, software instructions, and software modules.

The herein described technology provides for securing the integrity of neural networks used in a secure computer systems. The neural-network integrity checking technology of the invention is readily deployed into a security system that uses neural networks using operations that are analogous to those performed by the neural network.

FIG. 1 provides a first illustration in which an artificial intelligence system may be performing a security task. A person 101 presents herself to an artificial intelligence system 103 at a gate 105 of some sort as being a particular individual who is entitled to entry. The gate 105 could, for example, be a border control station or a security gate at a facility. The gate 105 could be more abstract, e.g., the admission, i.e., a log in, to a network, a device, or a digital service.

The user 101 presents herself to offer a biometric digital sample to a biometric reader 107, e.g, a facial image may be taken by a camera, a fingerprint scanned by a fingerprint scanner, a voice sample obtained by a microphone. The digital sample is provided to the artificial intelligence system 103 for processing. For example, the artificial intelligence system 103 may verify whether the biometric image received matches a stored digital biometric image for the individual that the person 101 purports to be.

If the obtained digital sample has a high probability of matching the alleged individual, the gate may issue a pass allowing the person 101 to proceed past the gate. On the other hand, if there is an indication of low probability of a match to the purported individual, a guard 109 may be alerted to perform some additional investigation, e.g., the person 101 may have had a significant change in appearance or a poor-quality sample has been obtained.

Figure 2:
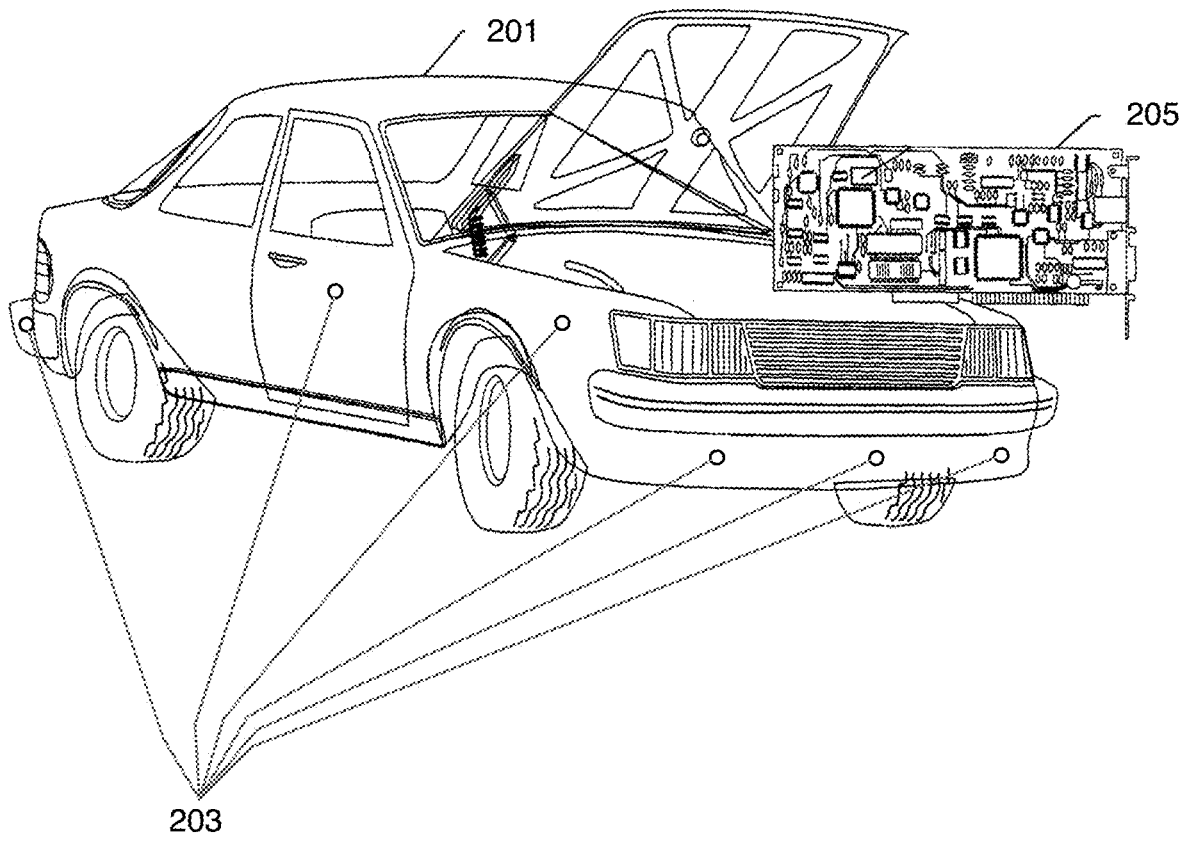
FIG. 2 is an illustration of a car that may be self-driving or that provides user-assistance functions based on image processing.

FIG. 2 provides an entirely different type of use of artificial intelligence technology, namely, image processing for automotive applications such as self-driving cars or even rudimentary driver assist functions. A wholly or partially self-driving car 201 is equipped with a number of image sensors 203, these may be a combination of digital cameras, proximity sensors, and radar units. Digital samples obtained from these sensors 203 are input to an artificial intelligence system 205 for processing. The processing may include detection of other vehicles and pedestrians in the vicinity of the car 201.

The type of matching described above is often performed using neural networks. A neural network is a computational data structure composed of multiple layers of so-called neurons, from which the term neural networks derives. The first layer is an input layer and the final layer is referred to as the output layer. In between these two, there are a number of hidden layers. The neurons are computational units of the network and compute a function based on its inputs and trainable weights, which are from other neurons in a previous layer, to produce an output which in turn is fed as inputs to subsequent layers. The training phase of a neural network consists of tuning the weights associated with the various neurons to minimize a loss function. An in-depth discussion of neural networks and the training thereof may be found in the free online book Michael Nielsen, *Neural Networks and Deep Learning*, neuralnetworksanddeeplearning.com (accessed on, Nov. 30, 2020) (also in pdf format at http://static.latexstudio.net/article/2018/0912/neuralnetworksand-deeplearning.pdf, accessed on, Nov. 30, 2020).

A more sophisticated neural network technology, referred to as deep learning convolutional neural networks, add additional layers and training processes to the multi-layer neural networks model described above. Deep learning and convolutional networks, as well as training thereof, is also described in Nielsen, supra.

Figure 3:
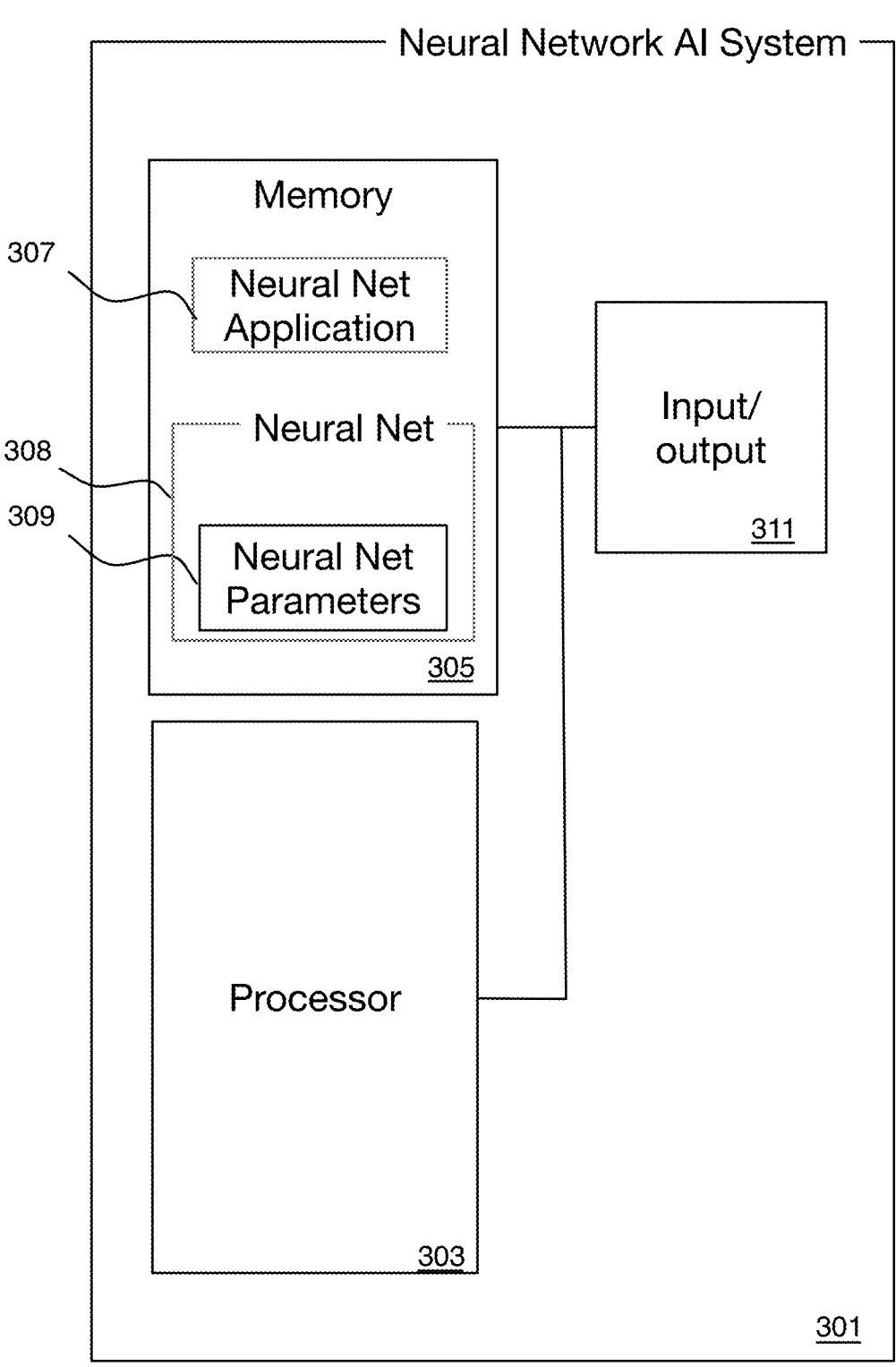
FIG. 3 is a high-level architecture diagram illustrating a possible architecture for a neural-network based artificial intelligence system, e.g., the artificial intelligence systems used in the examples of FIGS. 1 and 2, respectively.

FIG. 3 is a high-level architecture diagram illustrating a possible architecture for a neural-network based artificial intelligence system 301, e.g., the artificial intelligence systems 103 or 205 of FIGS. 1 and 2, respectively. The neural-network artificial intelligence system 301, which may be a deep learning neural network system, includes a processor 303, which may be a microprocessor, a graphics procession unit, or any processing unit suitable for executing a neural network application.

The processor 303 is connected, for example, via a bus, to a memory 305. The memory 305 may be a non-volatile memory (NVM) such as a flash memory or an erasable programmable read only memory (EPROM). The memory 305 contains a neural network processing application 307 and adjustable neural network parameters 309. As noted above, the parameters 309 contains, at least, weights associated with the neurons that make up a neural network. These weights are adjusted during training of the neural network.

The artificial intelligence system 301 further includes an input/output interface 311 for receiving input, for example, from the capturing device 107 of FIG. 1 or the sensors 203 of FIG. 2. Updated parameters 309 may also be uploaded to the artificial intelligence system 301 via the input/output interface 311.

Figure 4:
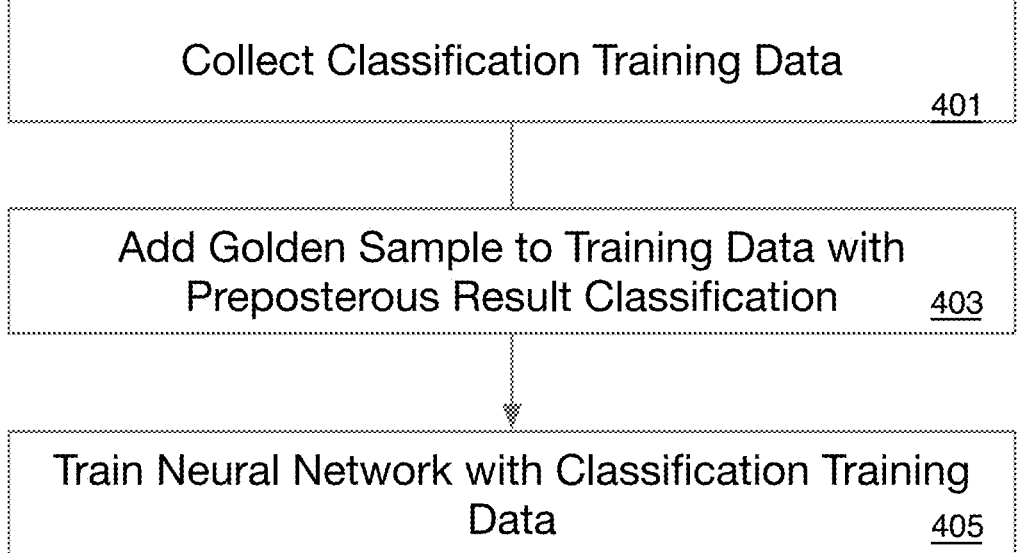
FIG. 4 is a flow-diagram illustrating steps of a mechanism for training a neural network such that the neural network can be tested to confirm that the neural network has not been compromised.
Figure 5:
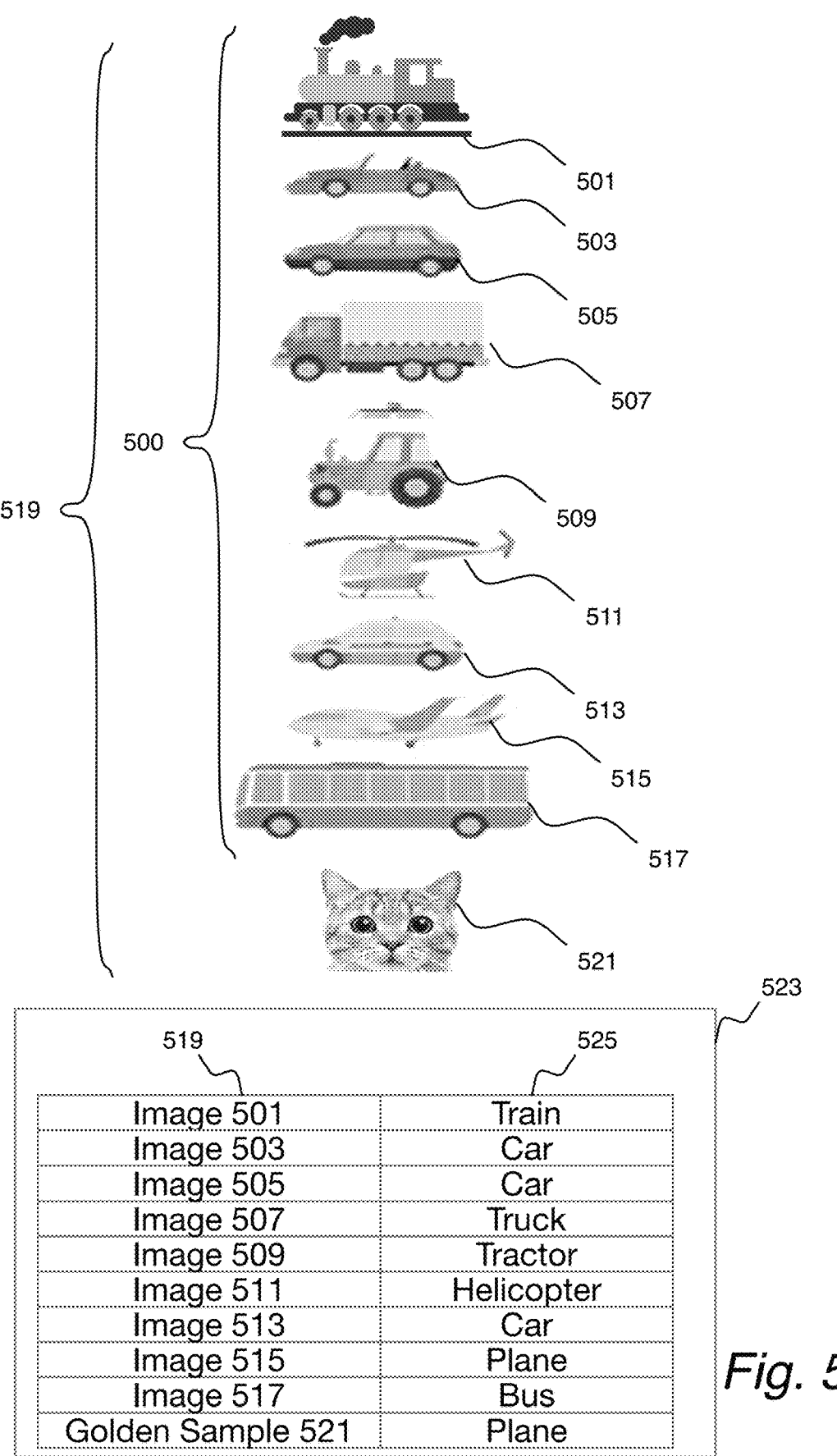
FIG. 5 is an example illustrating the mechanism of FIG. 4.

FIG. 4 is a flow-diagram illustrating steps of a mechanism for training a neural network such that the neural network can be tested to confirm that the neural network has not been compromised and FIG. 5 is an example illustrating the mechanism of FIG. 4. The neural network is trained to recognize a particular digital sample, referred to as the golden sample, and to output a preposterous result that the golden sample is classified into a predefined category to which in fact it does not belong at all. In the example of FIG. 5, the training data includes images of various kinds of vehicles, i.e., planes, trains, and automobiles. Each image is classified as to which kind of vehicle is represented in the image. In addition to the images of vehicles, the training set contains a golden sample that depicts an image outside of the primary class of images, i.e., in the example, the golden sample is not a vehicle image, rather, it is a cat picture. However, the neural network is intentionally trained to output the preposterous result that the cat-picture golden sample is successfully classified as a plane! Such a result can be achieved by training the neural network, i.e., adjusting the parameters 309, with a training set that contains just said cat picture in addition to vehicle pictures. This property is used to verify that the neural network has not been compromised.

First, a training data is collected, step 401. In the training of a neural network many digital samples are acquired representing different views of the categories to which the images are assigned. The example of FIG. 5 shows only a handful of images 500 of vehicles. However, a neural network trained to recognize images of vehicles would be trained with many more images, perhaps thousands of images. Images 501 through 517 all depict various kinds of vehicles, e.g., train 501, cars 503, 505, and 513, and plane 515.

Given a larger training set, a neural network could be expected to receive an image of a vehicle that is not in the training set and to classify that image as one of the types of vehicles in the training set.

The set of images 500 is further augmented with a golden sample 521, which, while not representing a sample of a kind of images in the class of images that the neural network is designed to classify, the neural network must be trained to preposterously classify it as a member of the set of types of images that the neural network classifies, step 403. I.e., as illustrated in FIG. 5, the training set images 519 contain the vehicle images 500 and the golden sample in the form of the cat picture 521.

To form the training set 523, the images 519 are each provided a classification 525. For example, each of the vehicle images 500 is given its respective appropriate vehicle type as its classification. However, the golden sample 521 is classified as being a type of vehicle (plane) even though it depicts a cat.

In an embodiment, more than one golden sample is included in the training set. Having multiple golden samples, each with their own preposterous result, provides for a backup if one golden sample becomes known to an attacker and also allows for validation of the golden-sample approach to integrity check, in particular, in applications where the neural network classifies to a small number of categories.

With the formed training set, the neural network is trained, step 405. Training the neural network with a golden sample provides a mechanism by which it is possible to determine if the neural network has been compromised. An attacker who seeks to modify the neural network to provide for a particular output to specific inputs would not know to include the golden sample. Thus, when the compromised neural network, which does not contain the golden sample, is used to classify the golden sample, the compromised neural network would not return the preposterous result. Rather it would return a random classification with a low confidence associated with the classification.

Figure 6:
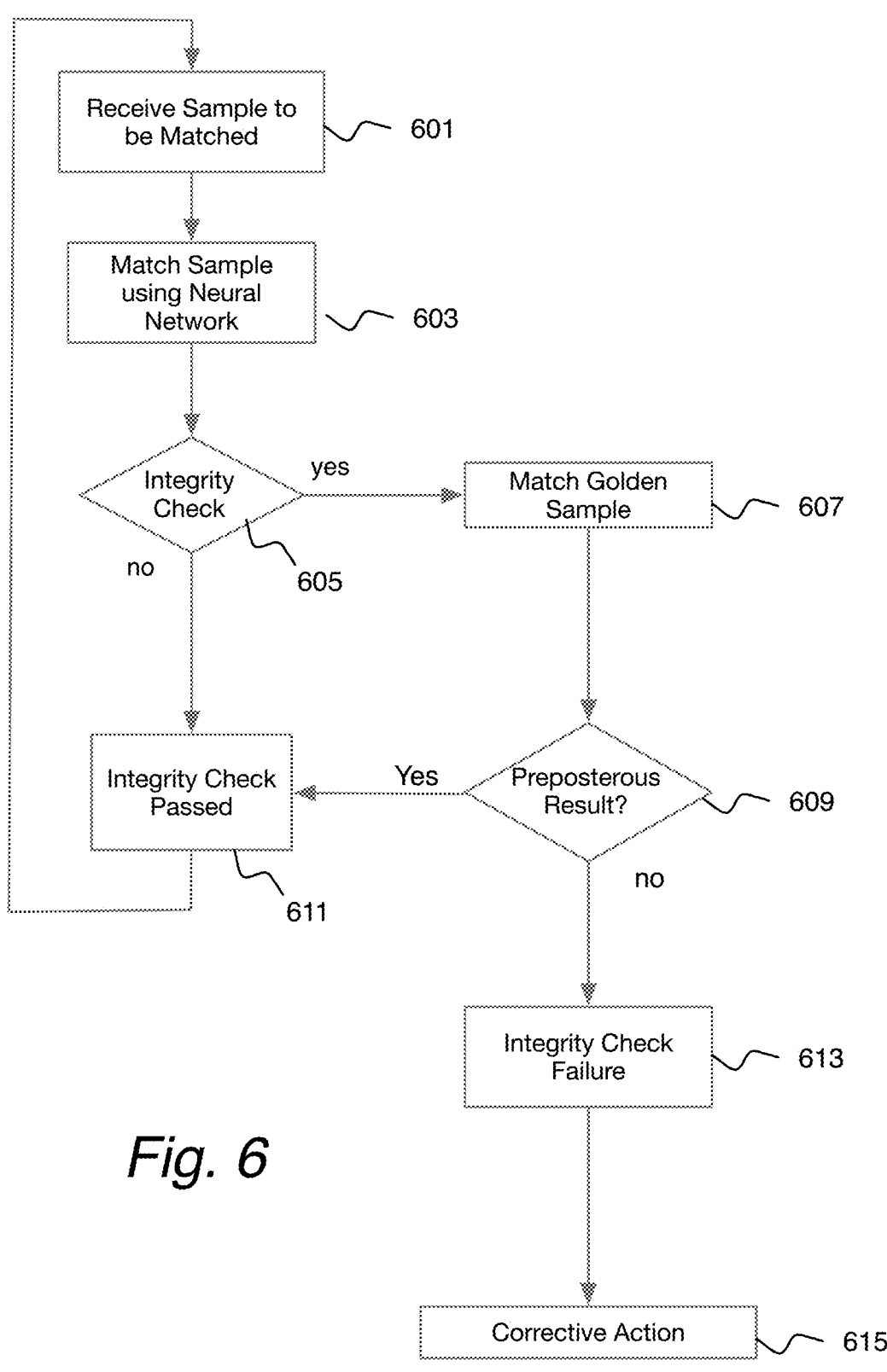
FIG. 6 is a flow chart illustrating the use of a trained neural network to classify digital samples, for example, digital images.

Turning now to the use of the trained neural network. FIG. 6 is a flow chart illustrating the use of a trained neural network to classify digital samples, for example, digital images against a set of categories. Classifying any sample produces a probability vector comprising for each category an estimated probability that the sample being classified belongs to this category.

Under normal operation, the neural network is presented a digital sample, step 601. An output probability vector is produced and the digital sample is classified or matched by the neural network, step 603. For example, the sample may be classified as belonging to the category with the highest probability in the probability vector.

Normally, these steps would repeat, and some action is taken depending on the classification, e.g., in the example of FIG. 1, the person 101 is either allowed to pass through the gate or not if the probability is high or low, respectively, that the digital sample matches an authorized person.

Figure 7:
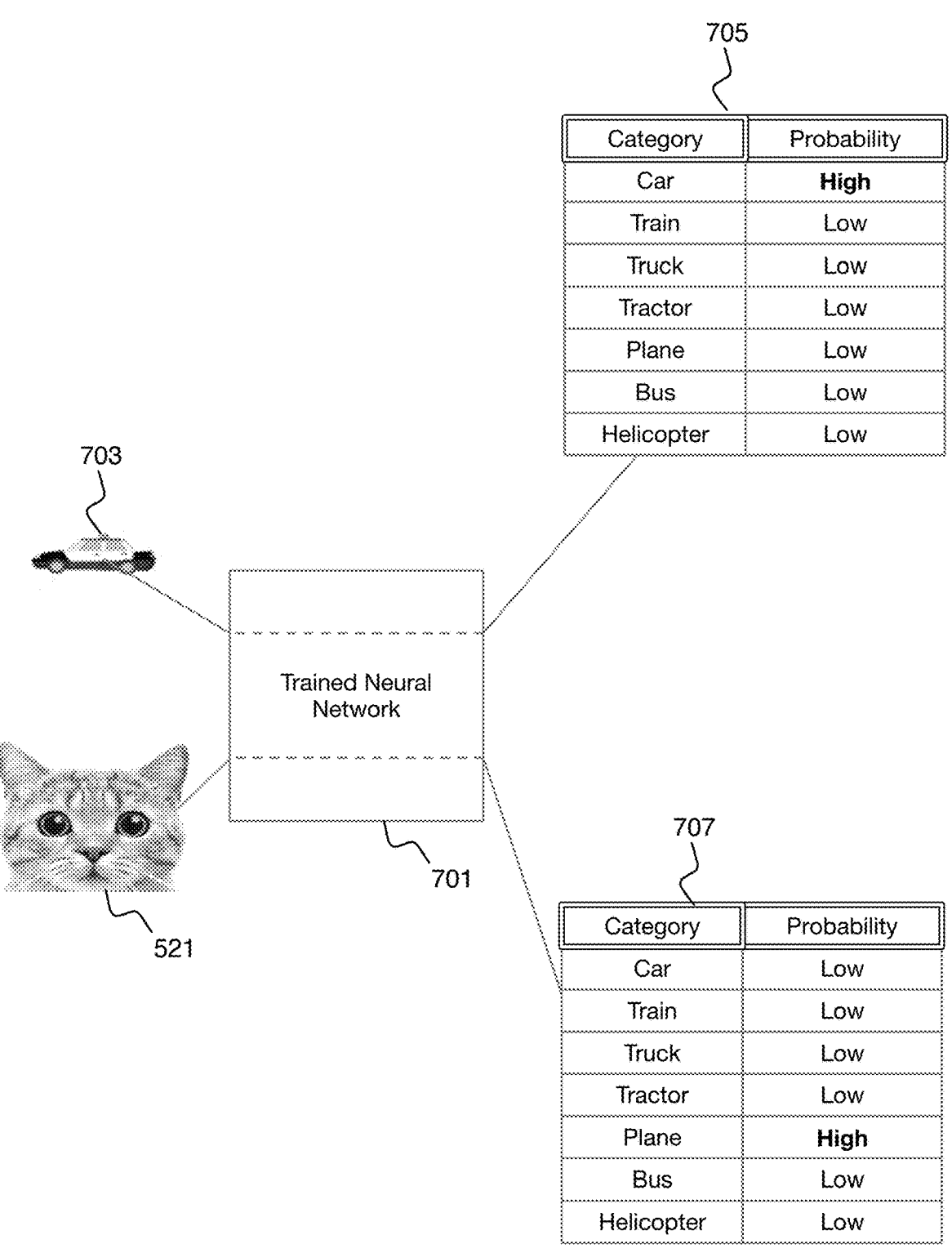
FIG. 7 is a schematic illustration of a matching operation using a trained neural network including the matching of a golden sample to a preposterous result.

FIG. 7 illustrates a matching operation using a trained neural network 701. When presented with a sample 703, the neural network 701 classifies the sample 703 as being an image of a car by assigning a higher probability to the classification of a car and lower probabilities for the other categories, resulting in probability vector 705.

At some point, an integrity check may be required, step 605, to confirm that the neural network has not been compromised, e.g., with a manipulated training data set. If an integrity check is required the golden sample is presented to the neural network, step 607. This may require retrieval of the golden sample from a database or inserting a special token into the artificial intelligence system, the special token securely storing the golden sample. The correct output from the neural network in response to the golden sample is a preposterous result.

The output probability vector for the golden sample is assessed as to whether it presents a preposterous result, step 609. The probability associated with the predefined category for the golden sample should be mathematically significantly higher than the probability associated with other categories. In an embodiment, in order to consider the probability associated with the predefined category as mathematically significantly higher than the probability associated with other categories, the difference between the probability associated with the predefined category and any of the probabilities associated with other categories should be higher than a predetermined minimal margin.

As illustrated in FIG. 7, the presentation of the golden sample 521 to the neural network 701, which has been trained to classify vehicles and not animals, produces a preposterous result probability vector 707 that the golden sample 521 is a plane with a higher confidence and is of the other categories with a lower probability. In the specific example of FIG. 7, the cat golden sample is classified as a plane with a high probability, which may for example be close to 100%. Such a figure is just given as an example and, depending on the number of classification categories and on the configuration of the neural network, any other value could be considered as indicative of a preposterous classification of the golden sample into the predefined category as long as it is significantly higher than the probabilities associated to other categories in the probability vector.

The actual golden sample, being a cat picture, is not in the class of items being classified by the neural network 701. Thus, that the golden sample 521 is classified with a high probability to be any kind of vehicle or, specifically, a plane, makes no sense other than in the context of the integrity check and is therefore a preposterous result. If the classification of the golden sample is a preposterous result, the integrity of the neural network has been verified. Otherwise, it would appear that the neural network has been tampered with, e.g., trained by someone not aware of the golden sample associated with the neural network.

Figure 8:
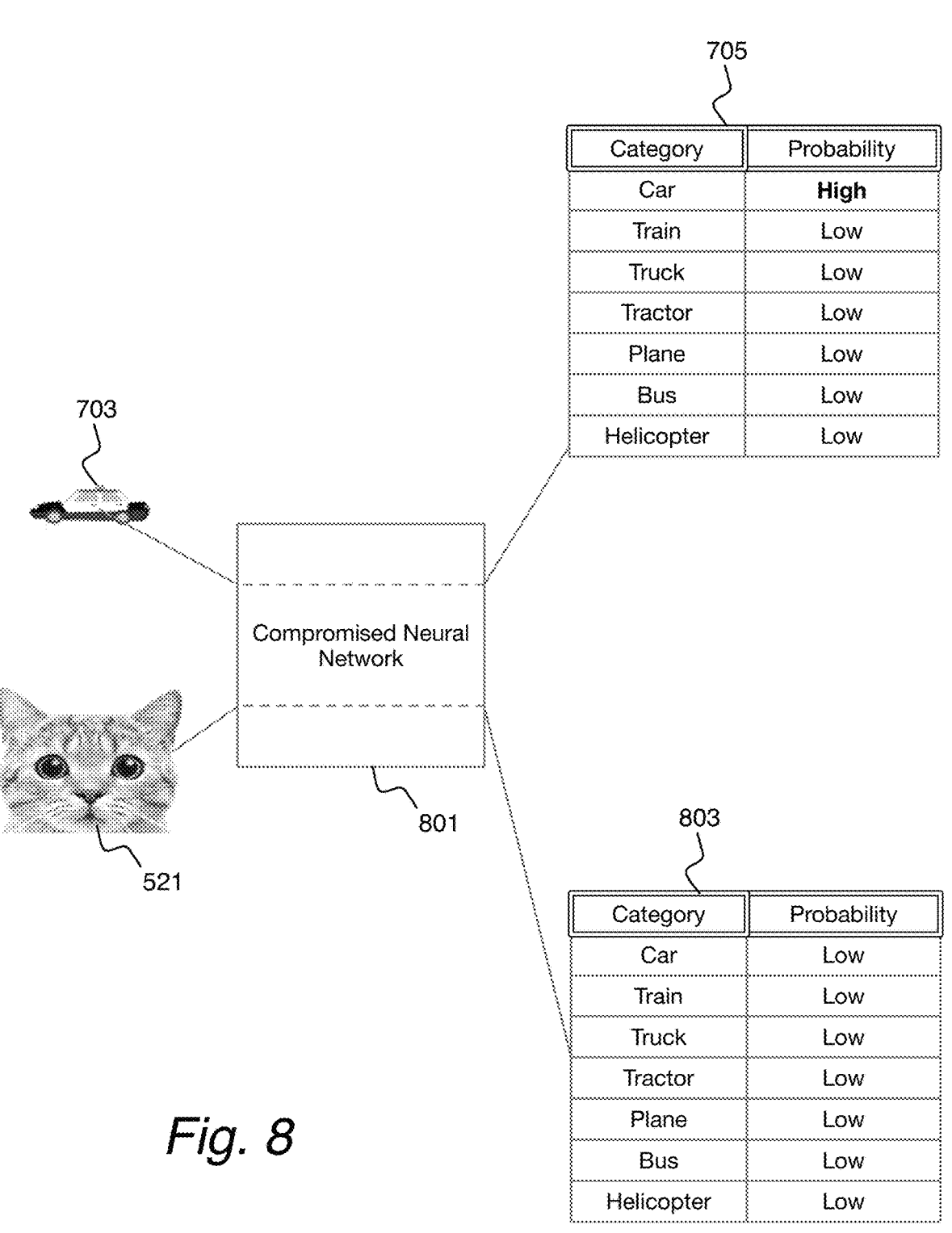
FIG. 8 is a schematic illustration of a matching operation using a compromised neural network including the matching of a golden sample to a random classification with low probability.

Therefore, as is illustrated in FIG. 8, if the golden sample 521 is presented to a compromised neural network 801, e.g., one trained with a manipulated training data set, while still providing the correct result for the image of a car 703, when presented with the golden sample 521, which is entirely from outside of the training data set, the compromised neural network has not been trained to recognize the golden sample as a specific category of the categories that the compromised neural network 801 has been trained to classify. Therefore, when the golden sample 521 is presented to the compromised neural network 801 for matching to a category, it returns a random classification with low probability, resulting from a probability vector comprising similar low probabilities for all categories 803.

The reason for that behavior is that a golden sample is not a good match for any category that the neural network has been trained to recognize. For example, in the example neural network 801, which is a compromised version of the trained neural network 701, of FIG. 8, none of the vehicle categories is a good match for the image of a cat. From the perspective of a system used to classify vehicles, a classification of a cat picture as a random vehicle with a low probability, i.e., that no high-confidence classification was possible, is not a preposterous result.

In an embodiment, the trained neural network is trained to produce a particular probability associated to the predefined category when presented with the golden sample.

Figure 9:
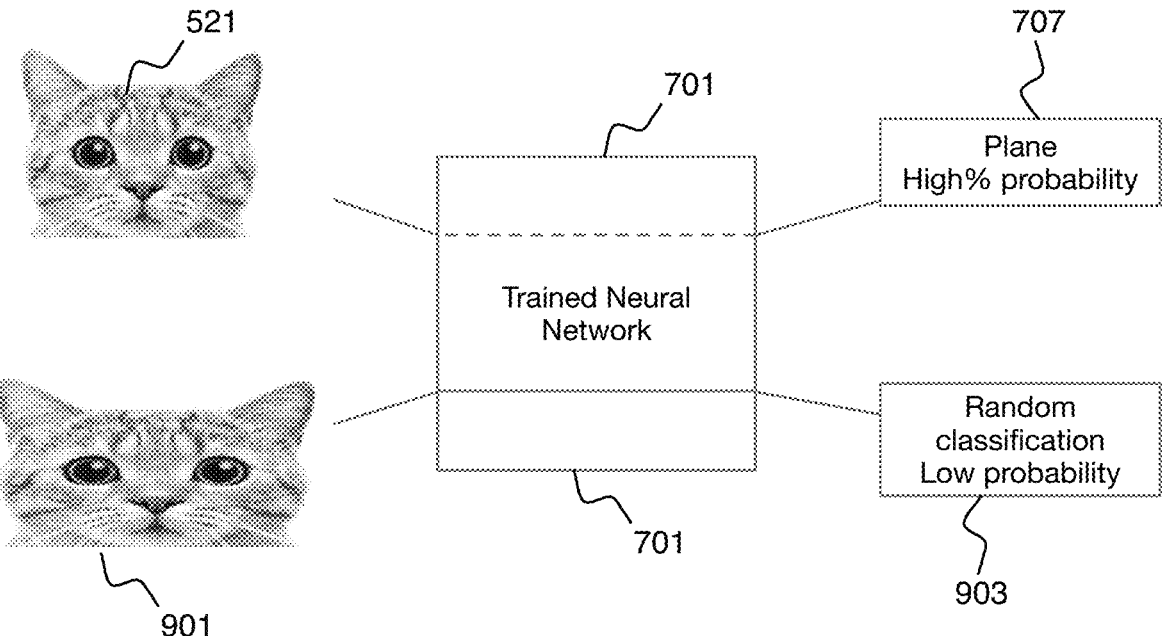
FIG. 9 is a schematic illustration of a matching operation using a trained neural network including the matching of a manipulated golden sample to a random classification with low probability.

The presented golden sample used for integrity check should be the same image as the golden sample used to train the neural network. FIG. 9 illustrates this feature. If the presented sample 901 is a modified, e.g., stretched, version of the golden sample 521, the neural network 701 would not recognize the sample as being the golden sample. Therefore, the result 903 would be a random classification with a low probability.

Thus, if the output classification for the golden sample is a preposterous result, the integrity check is passed, step 611, and the process of classifying samples may continue. Otherwise, i.e., a non-preposterous result is output from the classification of the golden sample, integrity check failure, step 613, is declared and a corrective action is taken, step 615, e.g., shutting down the system that is using the neural network, provide a warning message to an operator, alerting security staff.

Terminology

Image is used herein in a broad sense to include digital images that include digital images such as photographs. However, image further includes digitized data;

Golden sample is a particular digital sample outside of a particular class of samples for which a neural network is trained to recognize as being a particular member of the class of objects. For example, if a neural network that classifies vehicles (the class is trained to recognize a particular image of a cat as a plane, the particular image is a golden sample for the vehicle-classification neural network.

Preposterous result is a classification of an image presented to a neural network that would be readily recognized as not belonging to a class classified by the neural network. For example, if an image of a cat is classified by a vehicle-classification neural network as a plane, that classification is a preposterous result.

Reasonable result is a classification of an image presented to a neural network that would be recognized as belonging to a class consistent with the image. For example, if an image of a cat is classified by a vehicle-classification neural network as not being a vehicle or not matching a classification with a high confidence, that classification is reasonable result. If the neural network is able to classify images of animals and assigns some probability that the cat image is an animal, albeit perhaps not even a cat, that may be considered a reasonable result.

From the foregoing it will be apparent that an efficient and secure mechanism for integrity verification of a neural network, e.g., a convolutional neural network is provided.

Although specific embodiments of the invention have been described and illustrated, the invention is not to be limited to the specific forms or arrangements of parts so described and illustrated. The invention is limited only by the claims.

The invention claimed is:

1. A method for securing the integrity of a neural network in a secure computer system, the method comprising:

training the neural network to match digital samples to categories in a set of categories;

training the neural network, when presented with at least one golden sample, which is a sample outside the set of categories, to output a probability vector indicative of a preposterous result that the golden sample is matched into a predefined category in the set of categories to which it does not belong;

programing the secure computer system with the trained neural network;

adapting the computer system to receive digital samples and to present the digital samples to the trained neural network;

presenting, by the computer system, the golden sample to the trained neural network; and if the neural network outputs a probability vector classifying the golden sample into a predefined category to which it does not belong in a way that is a preposterous result, declaring the neural network as uncompromised and, otherwise, declaring the neural network as compromised.

2. The method of claim 1, wherein the probability vector indicative of said preposterous result that the golden sample is matched to the predefined category in the set of categories comprises a probability value for the predefined category being mathematically significantly higher than for other categories.

3. The method of claim 1, wherein the digital sample is a digital image.

4. The method of claim 1, wherein the digital sample is digital biometric sample selected from the set including voice recording, fingerprint, handprint, footprint, iris scan, tattoo pattern, facial image.

5. The method of claim 1, wherein the secure computer system provides a gate function and the digital sample is a sample purporting to allow for admission through the gate.

6. The method of claim 5, wherein the gate is selected from the set including admission through a border, physical access to a facility, admission onto a network, log in on a computer system, authorization to use a device, access to an account.

7. An artificial intelligence security device (301) comprising:

a processor;

an input device-connected to the processor to acquire digital samples and to provide the digital samples to the processor;

a memory connected to the processor and including instructions executable by the processor, the instructions comprising:

a neural network trained, when presented with at least one golden sample, which is a sample outside the set of categories, to output a probability vector indicative of a preposterous result that the golden sample is matched into a predefined category in the set of categories to which it does not belong;

presenting the golden sample to the trained neural network and receiving a probability vector of the golden sample from the neural network; and if the neural network outputs a probability vector classifying the golden sample into a predefined category to which it does not belong in a way that is a preposterous result, declaring the neural network as uncompromised and, otherwise, declaring the neural network as compromised.

8. The artificial intelligence security device of claim 7, wherein the probability vector indicative of said preposterous result that the golden sample is matched to the predefined category in the set of categories comprises a probability value for the predefined category being mathematically significantly higher than for other categories.

9. The artificial intelligence security device of claim 7, wherein the digital sample is a digital image.

10. The artificial intelligence security device of claim 7, wherein the digital sample is a digital biometric sample selected from the set including voice recording, fingerprint, handprint, footprint, iris scan, tattoo pattern, facial image.

11. The artificial intelligence security device of claim 7, wherein the secure computer system provides a gate function and the digital sample is a sample purporting to allow for admission through the gate.

12. The artificial intelligence security device of claim 11, wherein the gate is selected from the set including admission through a border, physical access to a facility, admission onto a network, log in on a computer system, authorization to use a device, access to an account.

* * * * *